United States Patent
Joerger

(10) Patent No.: US 10,799,951 B2
(45) Date of Patent: Oct. 13, 2020

(54) METHOD AND CONFORMAL SUPPORTS FOR ADDITIVE MANUFACTURING

(71) Applicant: GENERAL ELECTRIC COMPANY, Schenectady, NY (US)

(72) Inventor: Daniel Joerger, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 687 days.

(21) Appl. No.: 15/042,019

(22) Filed: Feb. 11, 2016

(65) Prior Publication Data

US 2017/0232512 A1    Aug. 17, 2017

(51) Int. Cl.
| B22F 3/105 | (2006.01) |
| B29C 64/153 | (2017.01) |
| B29C 64/40 | (2017.01) |
| B33Y 10/00 | (2015.01) |

(52) U.S. Cl.
CPC .......... B22F 3/1055 (2013.01); B29C 64/153 (2017.08); B29C 64/40 (2017.08); *B22F 2003/1058* (2013.01); *B33Y 10/00* (2014.12); *Y02P 10/295* (2015.11)

(58) Field of Classification Search
CPC ........... B22F 3/1055; B22F 2003/1058; B29C 64/153; B29C 64/40
See application file for complete search history.

(56) References Cited

U.S. PATENT DOCUMENTS

| 4,863,538 | A | 9/1989 | Deckard |
| 5,460,758 | A | 10/1995 | Langer et al. |
| 5,529,471 | A | 6/1996 | Khoshevis |
| 5,656,230 | A | 8/1997 | Khoshevis |
| 5,837,960 | A | 11/1998 | Lewis et al. |
| 5,897,825 | A | 4/1999 | Fruth et al. |
| 6,471,800 | B2 | 10/2002 | Jang et al. |

(Continued)

FOREIGN PATENT DOCUMENTS

| DE | 10 2015 104 676 A1 | 10/2015 |
| EP | 2570595 A1 | 3/2013 |

(Continued)

OTHER PUBLICATIONS

Extended European Search Report and Opinion issued in connection with corresponding EP Application No. 17155578.2 dated Jul. 3, 2017.

(Continued)

*Primary Examiner* — Colleen P Dunn
*Assistant Examiner* — Jeremy C Jones
(74) *Attorney, Agent, or Firm* — Dority & Manning, P.A.

(57) ABSTRACT

The present disclosure generally relates to methods for additive manufacturing (AM) that utilize conformal support structures in the process of building objects, as well as novel conformal support structures to be used within these AM processes. The conformal support structures include a first portion that extends from a platform to a concave upward surface of the first portion that is below a downward facing convex surface of the object. The concave upward surface corresponds to the downward facing convex surface. The downward facing convex surface of the object is separated from the concave upward surface of the first portion by at least one portion of unfused powder.

4 Claims, 10 Drawing Sheets

(56) References Cited

U.S. PATENT DOCUMENTS

| | | |
|---|---|---|
| 6,995,334 B1 | 2/2006 | Kovacevic et al. |
| 6,995,335 B2 | 2/2006 | Wessner |
| 7,381,921 B2 | 6/2008 | Hagemeister et al. |
| 7,435,072 B2 | 10/2008 | Collins et al. |
| 8,470,234 B2 | 6/2013 | Clark |
| 8,506,836 B2 | 8/2013 | Szuromi et al. |
| 8,684,069 B2 | 4/2014 | Mottin et al. |
| 9,188,341 B2 | 11/2015 | McMasters et al. |
| 2002/0062909 A1 | 5/2002 | Jang et al. |
| 2012/0113439 A1 | 5/2012 | Ederer |
| 2013/0071562 A1 | 3/2013 | Szuromi et al. |
| 2013/0316084 A1 | 11/2013 | Szuromi et al. |
| 2014/0251481 A1 | 9/2014 | Kroll et al. |
| 2014/0300017 A1 | 10/2014 | Wighton et al. |
| 2014/0335313 A1 | 11/2014 | Chou et al. |
| 2015/0021379 A1 | 1/2015 | Albrecht et al. |
| 2015/0258609 A1* | 9/2015 | Teulet ............... B29C 64/30 419/53 |
| 2016/0368224 A1* | 12/2016 | Ooba ............... B22F 3/008 |
| 2017/0050387 A1* | 2/2017 | Ederer ............... B33Y 80/00 |
| 2017/0095887 A1* | 4/2017 | Marchione ........ B23K 26/342 |
| 2017/0232511 A1 | 8/2017 | Fieldman et al. |
| 2017/0232670 A1 | 8/2017 | Joerger et al. |
| 2017/0232671 A1 | 8/2017 | Fieldman |
| 2017/0232672 A1 | 8/2017 | Alcantara Marte et al. |
| 2017/0232682 A1 | 8/2017 | Alcantara Marte et al. |
| 2017/0232683 A1 | 8/2017 | Alcantara Marte et al. |
| 2017/0239719 A1* | 8/2017 | Buller ............... B23K 26/032 |

FOREIGN PATENT DOCUMENTS

| | | |
|---|---|---|
| EP | 3 015 251 A1 | 5/2016 |
| JP | H04-506778 A | 11/1992 |
| JP | 2003-181941 A | 7/2003 |
| JP | 2005-297573 A | 10/2005 |
| JP | 2015-529579 A | 10/2015 |
| WO | WO 2014/071135 A1 | 5/2014 |
| WO | 2014/208743 A1 | 12/2014 |
| WO | 2015/145320 A1 | 10/2015 |

OTHER PUBLICATIONS

Forderhase et al., "Reducing or Eliminating Curl on Wax Parts Produced in the Sinterstation™," 2000 System, (Abstract) pp. 94-100.

Carter Jr. et al., General Electric, "Direct Laser Sintering of Metals", (Abstract), pp. 51-59.

Jacobson et al., "Practical Issues in the Application of Direct Metal Laser Sintering," (Abstract), pp. 728-739.

Machine Translation and Notification of Reasons for Refusal issued in connection with corresponding JP Application No. 2017-021831 dated May 15, 2018.

Machine translation and First Office action and Search issued in connection with corresponding CN Application No. 201710307262.6 dated Oct. 25, 2018.

* cited by examiner

METHOD AND CONFORMAL SUPPORTS FOR ADDITIVE MANUFACTURING

INTRODUCTION

The present disclosure generally relates to methods for additive manufacturing (AM) that utilize support structures in the process of building objects, as well as novel support structures to be used within these AM processes.

BACKGROUND

AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

FIG. 1 is schematic diagram showing a cross-sectional view of an exemplary conventional system 100 for direct metal laser sintering (DMLS) or direct metal laser melting (DMLM). The apparatus 100 builds objects, for example, the part 122, in a layer-by-layer manner by sintering or melting a powder material (not shown) using an energy beam 136 generated by a source such as a laser 120. The powder to be melted by the energy beam is supplied by reservoir 126 and spread evenly over a build plate 114 using a recoater arm 116 travelling in direction 134 to maintain the powder at a level 118 and remove excess powder material extending above the powder level 118 to waste container 128. The energy beam 136 sinters or melts a cross sectional layer of the object being built under control of the galvo scanner 132. The build plate 114 is lowered and another layer of powder is spread over the build plate and object being built, followed by successive melting/sintering of the powder by the laser 120. The process is repeated until the part 122 is completely built up from the melted/sintered powder material. The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of access powder by, for example, blowing or vacuuming. Other post processing procedures include a stress release process. Additionally, thermal and chemical post processing procedures can be used to finish the part 122.

The present inventors have discovered that the additive manufacturing process described above may present difficulties for objects having downward facing convex surfaces. Downward facing convex surfaces, when built layer-by-layer, may include a layer having a scan pattern that covers a larger area than a solidified portion of an immediately preceding layer. The laser melting procedure described above may have undesired effects when building downward facing convex surfaces. For example, when the upper layer is melted, although some portions of the upper layer are supported by the solidified portion of the immediately preceding layer, other portions may be supported by only powder, which extends to the platform 114. One possible effect is that when the upper layer is melted, the molten material flows downward adjacent the solidified portion of the lower layer. Such pooling results in an undesirable rough texture of the downward facing convex surface. In another aspect, a support for a downward facing convex surface does not provide sufficient resistance to movement. For example, some known supports only support the downward facing convex surface at a lowest point. As the downward facing convex surface extends beyond the support, the object may become prone to movement within the powder bed 112. As another example, a downward facing convex surface supported mostly by powder may have relatively high thermal isolation leading to long thermal dissipation.

In view of the above, it can be appreciated that there are problems, shortcomings or disadvantages associated with AM techniques, and that it would be desirable if improved methods of supporting objects and support structures were available.

SUMMARY

The following presents a simplified summary of one or more aspects of the invention in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, the disclosure provides a method for fabricating an object using additive manufacturing comprising the steps of: (a) irradiating a layer of powder in a powder bed to form a fused region; (b) providing a subsequent layer of powder over the powder bed by passing a recoater arm over the powder bed from a first side of the powder bed; and (c) repeating steps (a) and (b) until the object and at least one support structure is formed in the powder bed, wherein the at least one support structure includes a first portion that extends from a platform to a concave upward surface of the first portion that is below a downward facing convex surface of the object, the concave upward surface corresponding to the downward facing convex surface; and wherein the object is built on top of the first portion and the downward facing convex surface of the object is separated from the concave upward surface of the first portion by at least one portion of unfused powder In another aspect, the disclosure provides a support structure for building an object using additive manufacturing. The support structure may include a first concave upward surface corresponding to a first downward facing convex surface of the object, the first concave upward surface located below the first downward facing convex surface of the object. The support structure may also include a body portion extending downward from the concave upward surface to a platform. The first downward facing convex surface of the object is separated from the first concave upward surface of the removable support structure by at least one portion of unfused powder.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Figure 1:
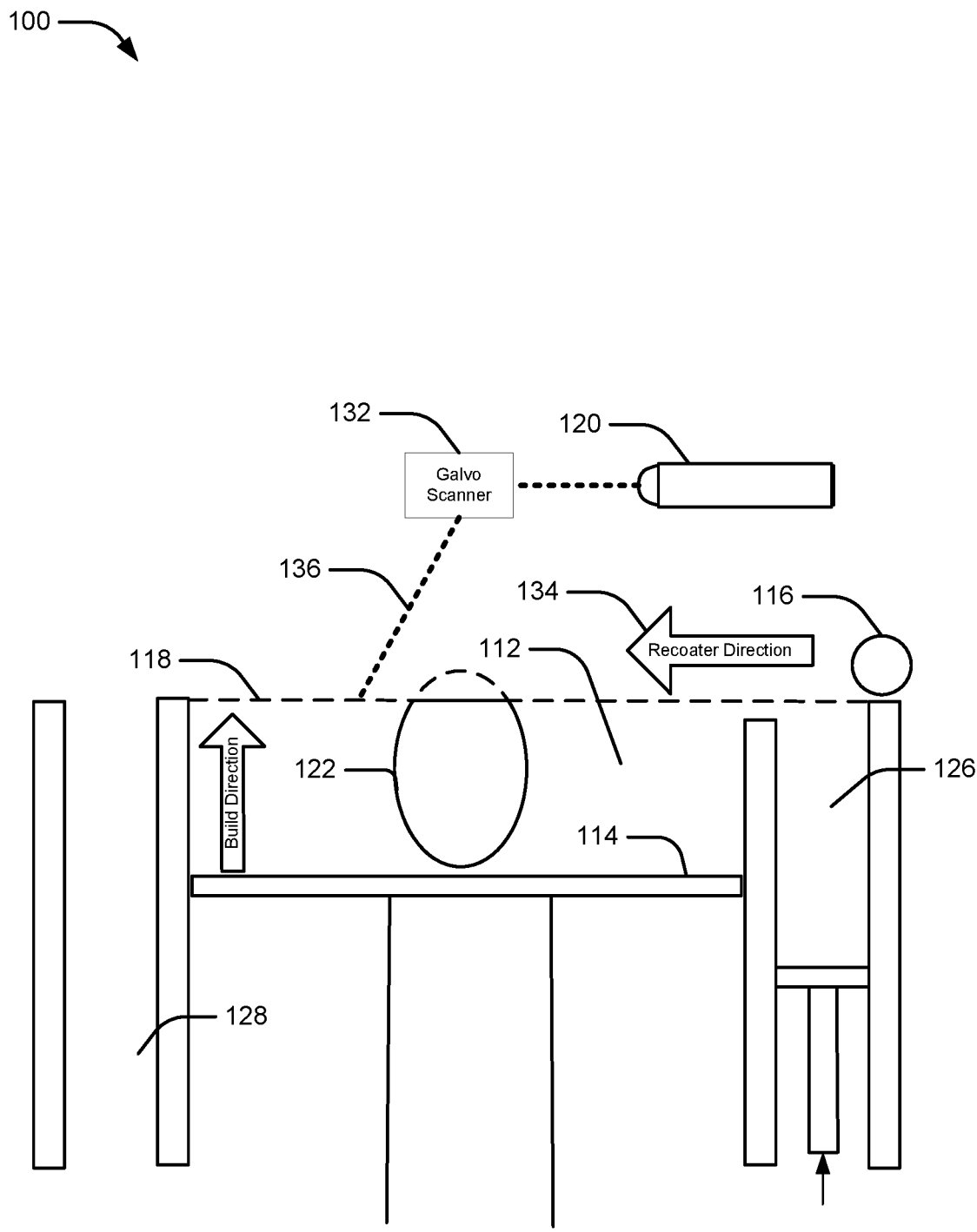
FIG. 1 is schematic diagram showing an example of a conventional apparatus for additive manufacturing.
Figure 2:
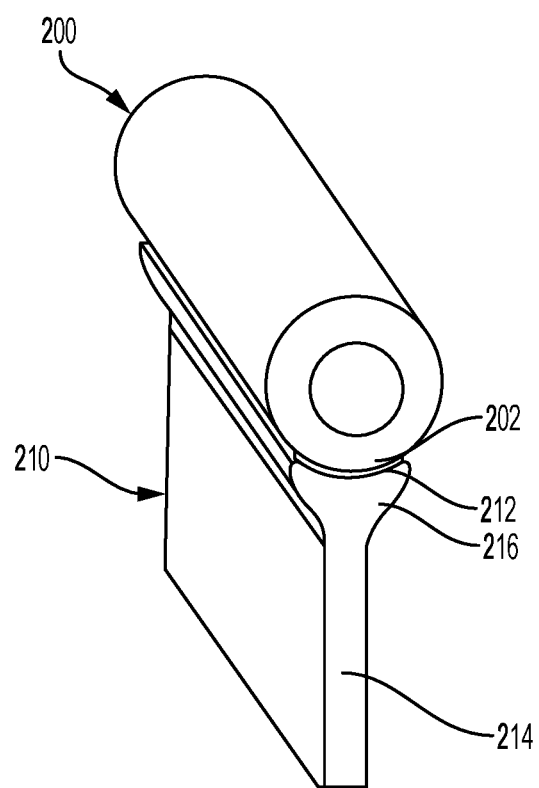
FIG. 2 illustrates a perspective view of an example of a cylindrical object supported by a support structure in accordance with aspects of the present invention.

FIG. 2 illustrates an example of a cylindrical object 200 supported by an example support structure 210. The cylindrical object 200 and the support structure 210 may be manufactured according to an AM process. For example, the apparatus 100 of FIG. 1 and method described above may be used. In this type of AM process, the object 200 is built layer-by-layer by selectively sintering or melting areas of the powder in the regions that form the object 200. The support structure 210 is built simultaneously with the object 200 by melting or sintering additional regions of the powder in the location of the support structure 210.

Upon completion of the AM process, the support structure 210 is removed from the object 200. In one aspect, the support structure 210 is attached along with the object to the build plate and may be detached from the build plate and discarded. The support structure 210 may alternatively be formed without attachment to the build plate as a free standing object within the powder bed. In addition, the support structure may include a point of attachment to the object 200 that may be readily broken away once the AM process is complete. This may be accomplished by providing a breakaway structure—a small tab of metal joining the object 200 and support structure 210. The breakaway structure may also resemble a perforation with several portions of metal joining the object 200 and support structure 210.

The removal of the support structure 210 from the object 200 may take place immediately upon, or during, removal of the object from the powder bed. Alternatively, the support structure may be removed after any one of the post-treatment steps. For example, the object 200 and support structure 210 may be subjected to a post-anneal treatment and/or chemical treatment and then subsequently removed from the object 200 and/or build plate.

The present inventors have found that certain objects may benefit from a support structure 210 that that conforms to a downward facing convex surface of the object without contacting the downward facing convex surface. In the example aspect illustrated in FIGS. 2-4, the cylindrical object 200 includes a downward facing convex surface 202. For example, in one dimension, along the length of the cylinder, the downward facing convex surface is flat, while in another dimension, across the width of the cylinder, the bottom surface of the cylindrical object 200 is convex. That is, at least one cross-section of the cylindrical object includes a downward facing convex edge. In other words, a function describing the height of the bottom surface of the cylindrical object is concave up in at least one dimension.

The support structure 210 is a support structure conforming to the downward facing convex surface 202. The support structure 210 includes a concave top surface 212 that conforms to the downward facing convex surface 202. For example, the concave top surface 212 has the same general shape as the downward facing convex surface. In an aspect, the concave top surface 212 is separated from the downward facing convex surface by a portion of unfused powder having a minimum height across the concave top surface 212. In other words, a function describing the height of the concave top surface 212 is equal to the function describing the height of the bottom surface of the cylindrical object minus the minimum height. In an aspect, the portion of unfused powder has a height equal to an incremental layer height of the platform 114 (e.g., one layer of powder). In an aspect, a minimum height separating the convex surface of the object and the concave upward surface is based on thermal properties of the powder. The minimum height is sufficient to prevent the unfused powder from sintering due to heat from the support structure or object. In an aspect, the minimum height is between 0.1 millimeters to 10 millimeters, preferably approximately 1 millimeter. Therefore, the support structure 210 may provide non-contact support for the cylindrical object 200. For example, the support structure 210 may be thermally coupled to the cylindrical object 200 via the portion of unfused powder without being in physical contact (e.g., fused to) the object 200. Moreover, the support structure 210 may provide support against movement (e.g., caused by the force of the recoater 116), by restricting the movement of the powder surrounding the object 200.

The support structure 210 further includes a body 214. The body 214 extends from the concave top surface 212 to the platform 114 or another stable surface (e.g., another object or support). The support structure 210 also includes a downward facing convex surface 216. In an aspect, the downward facing convex surface 216 is subject to the pooling effects described above, but such effects are not undesirable because the support structure 210 is discarded during post processing and does not require a smooth surface.

Figure 3:
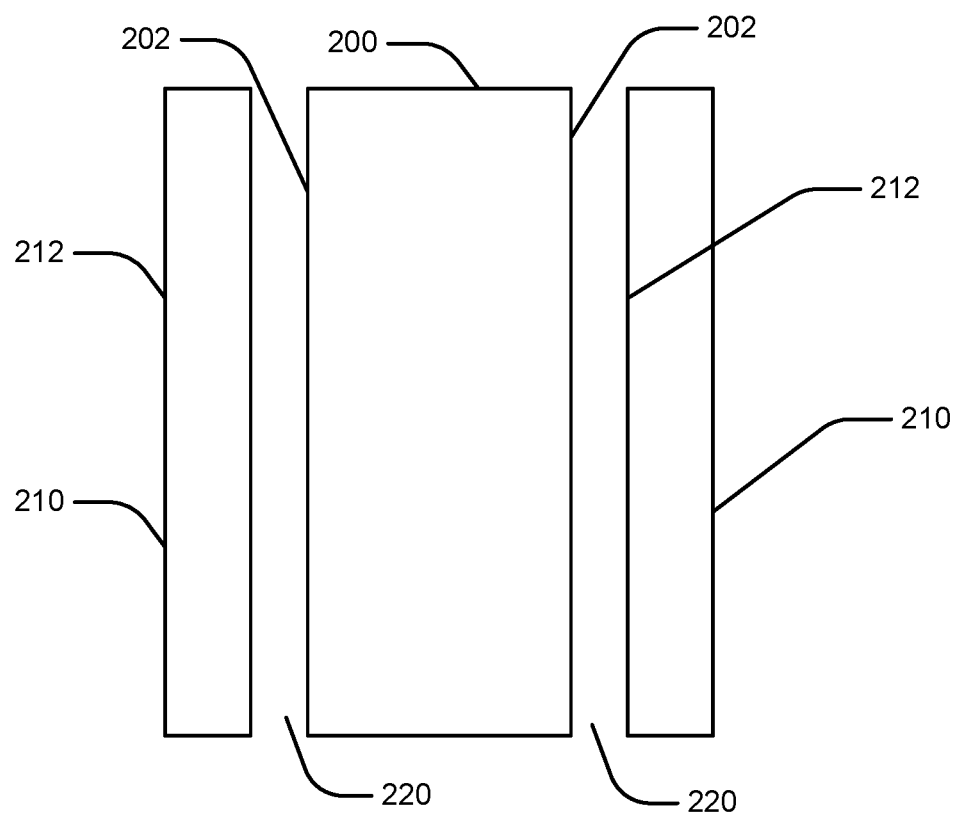
FIG. 3 illustrates a horizontal cross-sectional view of the cylindrical object and example support structure in FIG. 2.

FIG. 3 illustrates a horizontal cross-sectional view of the object 200 and the example support structure 210. The cross-sectional view may represent a scan pattern that may be solidified in a layer of powder. In the example layer illustrated, a portion of the object 200 and two portions of the support 210 are formed. As illustrated, the external edges of the portion of the object 200 form a portion of the downward facing convex surface 202. Similarly the internal edges of the two portions of the support 210 form portions of the concave top surface 212. A horizontal line of powder 220 separates each portion of the concave top surface 212 from the portion of the downward facing convex surface 202. It should be appreciated that the horizontal line of powder refers to any series of points in a horizontal plane. For example, the horizontal line of powder 220 may be a straight line, but may also include a curve.

Figure 4:
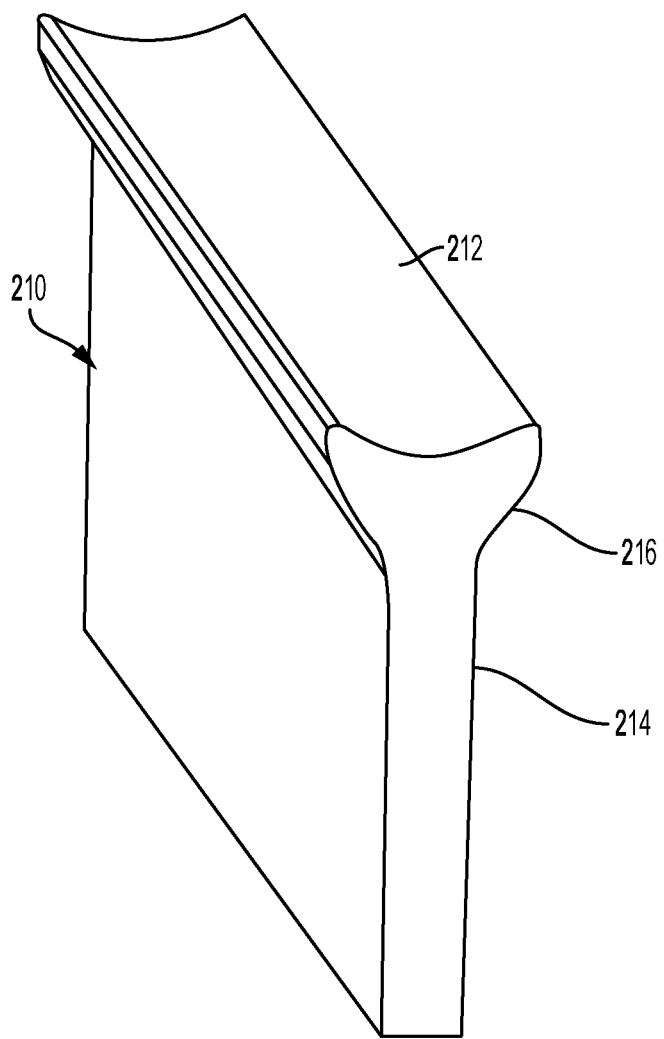
FIG. 4 illustrates a perspective view of the example support structure in FIG. 2.
Figure 5:
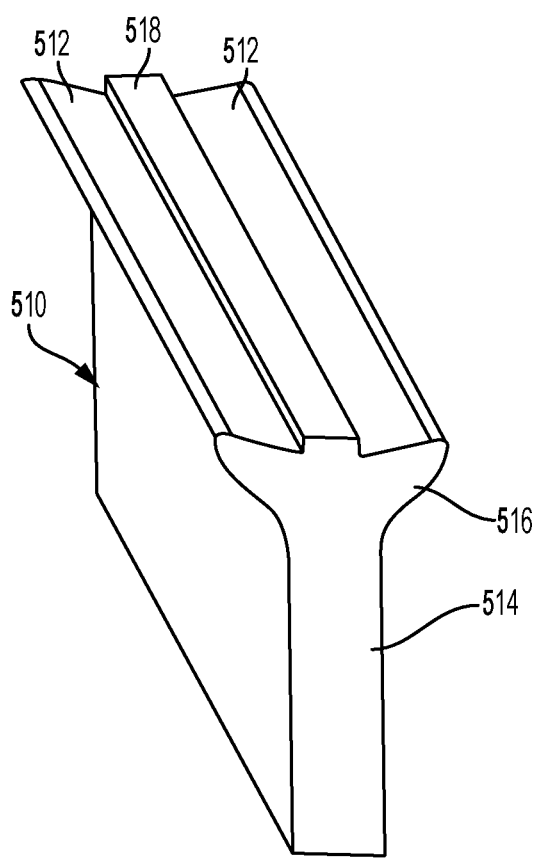
FIG. 5 illustrates a perspective view of another example support structure in accordance with aspects of the present invention.

FIG. 4 illustrates another view of the example support structure 210. In FIG. 5, the concave top surface 212 is visible.

FIG. 5 illustrates another example support structure 510. The support structure 510 is similar to the support structure 210 in some aspects and supports, for example, the cylindrical object 200. The support structure 510 and the object 200 may be manufactured in the same manner as the support structure 210 and the object 200 discussed above using the apparatus 100 of FIG. 1. The support structure 510 includes a top surface comprising two or more concave surfaces 512 and one or more contact surfaces 518. The concave surfaces 512 are separated from and conform to a downward facing convex surface 202 (FIG. 2). The contact surface 518 physically contacts the downward facing convex surface 202. For example, the contact surface 518 contacts the local minima of the object 200. In an aspect, the contact surface 518 includes features to enable separation from the object 200 during post-processing. For example, the contact surface 518 may minimize contact with the object 200 by contacting the object 200 along a narrow portion (e.g. a single scan line) having a periodic pattern (e.g., holes or perforations) that reduces the contact area. In an aspect, the contact surface 518 prevents movement of the object 200 via the physical contact while the two or more concave surfaces 512 provide for a smooth surface via non-contact support with a minimum height of powder separating the concave surfaces 512 from the object 200 as described above regarding support structure 210.

Figure 6:
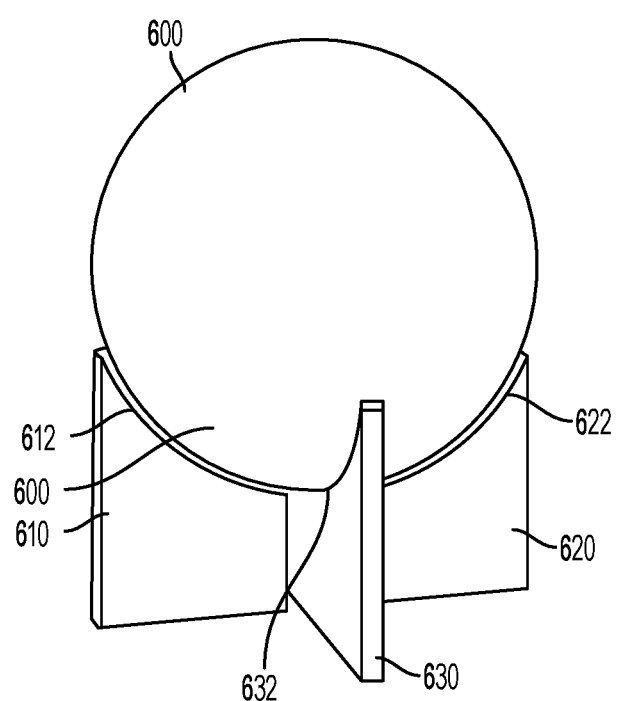
FIG. 6 illustrates a perspective view of an example of a spherical object supported by support structures in accordance with aspects of the present invention.

FIG. 6 illustrates an example of a spherical object 600 supported by support structure 610. The support structure 610 may include supports, 620, 630, and 640. The spherical object 600 may correspond to the object 122 (FIG. 1) and can be fabricated by the apparatus 100. In this type of AM process, the object 600 is built layer-by-layer by selectively sintering or melting areas of the powder in the regions that form the object 600. The support structure 610 is built simultaneously with the object 600 by melting or sintering additional regions of the powder in the location of the support structure 610.

Figure 7:
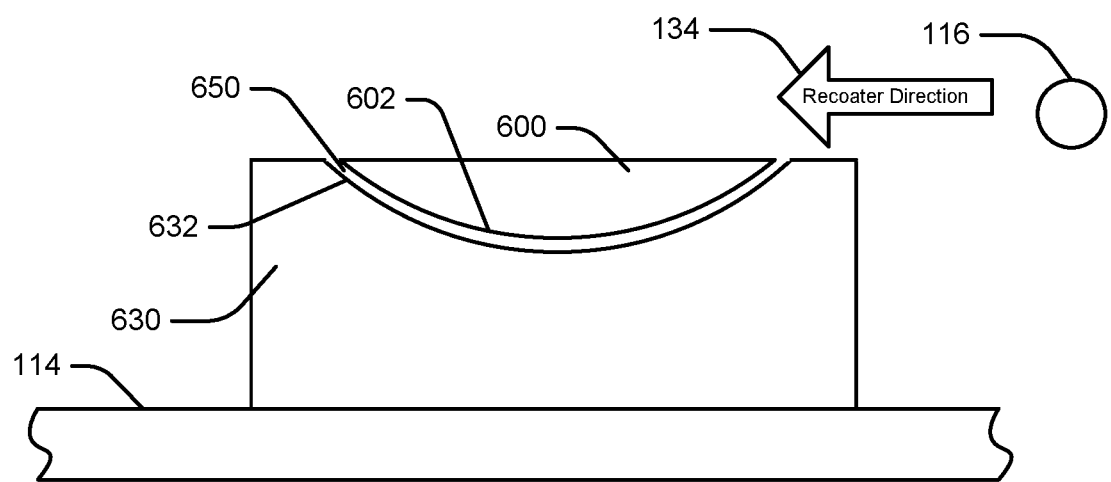
FIG. 7 illustrates a vertical cross-sectional view of the spherical object and the example support structure of FIG. 6 during a build process.
Figure 8:
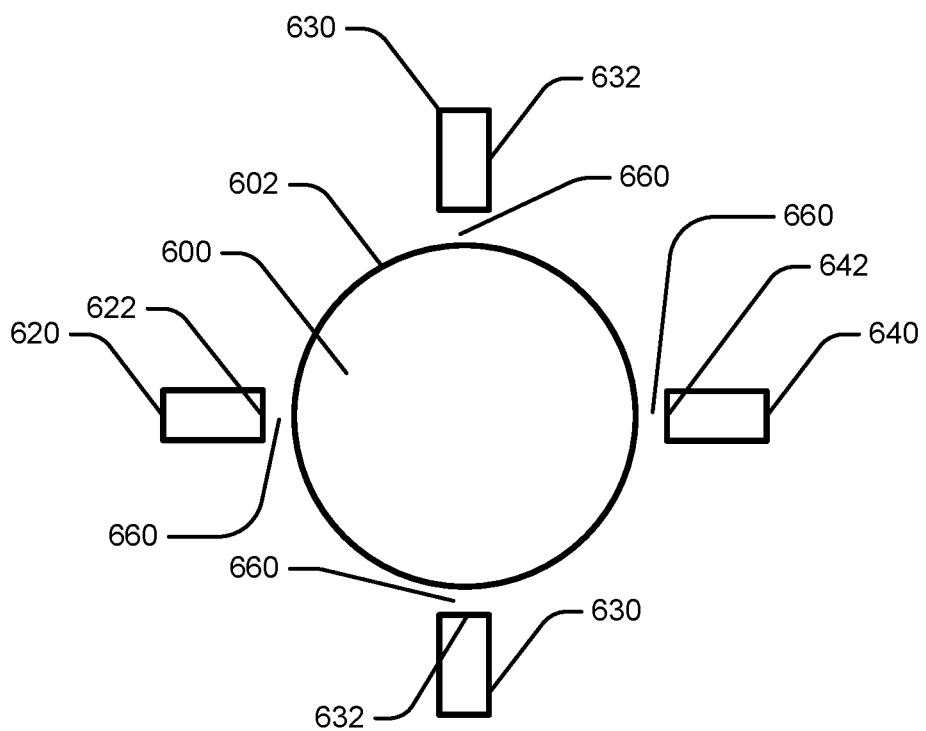
FIG. 8 illustrates a horizontal cross-sectional view of the spherical object supported by support structures in FIG. 6.

Upon completion of the AM process, the support structure 610 is removed from the object 600. As shown in FIGS. 6-8 support structure 610 is formed as a free standing structure within the powder bed. The object 600 is formed above a layer of unfused (e.g., unmelted or unsintered) powder 650 between a portion of the object 600 and support structure 610. The support structure may include a point of attachment to the object 600 (e.g. a contact surface) that may be readily broken away once the AM process is complete. This may be accomplished by providing a breakaway structure—a small tab of metal joining the object 600 and support structure 610. The breakaway structure may also resemble a perforation with several portions of metal joining the object 600 and support structure 610.

The removal of the support structure 610 from the object 600 may take place immediately upon or during removal of the object from the powder bed. Alternatively, the support structure may be removed after any one of the post-treatment steps. For example, the object 600 and support structure 610 may be subjected to a post-anneal treatment and/or chemical treatment and then subsequently removed from the object 600 and/or build plate.

The present inventors have found that certain objects may benefit from a support structure 610 that conforms to a downward facing convex surface of the object without contacting the downward facing convex surface. In the example aspect illustrated in FIGS. 6-8, the spherical object 600 includes a downward facing convex surface 602. In an aspect, a bottom portion of the spherical object 600 is considered a downward facing convex surface. The bottom portion of the spherical object 600 may be semi-spherical. For example, the bottom surface of the spherical object 600 is convex in any vertical plane. That is, at least one cross-section of the spherical object 600 includes a downward facing convex edge. In other words, a function describing the height of the bottom surface of the spherical object is concave up in at least one dimension.

The supports 620, 630, 640 each conform to the downward facing convex surface 602. In an aspect, the supports 620, 630, 640 conform to the downward facing convex surface 602 in different dimensions. For example, as illustrated, the supports 620 and 640 are perpendicular to the support structure 630. Accordingly, the concave top surface 622 of the support 610 and the concave top surface 632 of the support 630 conform to the downward facing convex surface 602 in a first dimension. For example, a function defining the concave top surface 622 in a first dimension is equal to the function describing the height of the bottom surface of the spherical object 600 minus a minimum height. The concave top surface 642 may be similarly defined. A function defining the concave top surface 632 in a second dimension perpendicular to the first dimension is equal to the function in the second dimension describing the height of the bottom surface of the spherical object 600 minus a minimum height. Although FIG. 6 illustrates supports 620, 630, 640 extending in perpendicular planes, it should be appreciated that supports may be oriented to each other at any angle and conform to a downward facing convex surface of an object along a respective angle.

FIG. 7 illustrates a vertical cross-sectional view of the object 600 and the example support 630 during a build process. The build process has completed a portion of the support structure 600 and a portion of the support 630. The downward facing convex surface 602 of the object 600 is separated from the concave top surface 632 of the support 630 by a portion 650 of unfused powder. The present inventors have found that a support structure 610 including a support similar to support 630 are particularly desirable in forming objects 600 having downward facing convex surfaces. The support 630 may provide physical support underneath the object 600 to prevent the object 600 from moving downward. Although the support 630 does not directly contact the object 600, the support 630 prevents movement of the portion of unfused powder 650 and supports the object via the portion of unfused powder 650. Moreover, the support 630 provides support against lateral forces, for example, forces generated by the recoater arm 116. Because the support 630 and object 600 are built layer by layer, the support 630 reaches the same height as the object 600. Therefore, a leading edge of the support 630 will be contacted by the new powder first as the recoater arm 116 moves in the recoater direction 134, as shown in FIG. 1. Additionally, the support 630 may support desirable thermal properties of the object 600. Because the support 630 and the object 600 are only separated by a small amount of powder, heat may flow from the object 600 into the support structure 630.

FIG. 8 illustrates a horizontal cross-sectional view of the object 600 and the example support structure 610 including supports 620, 630, and 640. The cross-sectional view may represent a scan pattern that may be melted in a layer of powder. In the example layer illustrated, a portion of the object 600, a portion of the support 620, a portion of the support 640 and two portions of the support structure 630 may be formed. As illustrated, the external circular edge of the portion of the object 600 may form a portion of the downward facing convex surface 602. Similarly the internal edges of the portions of the support structure 610 may form portions of the concave top surfaces 622, 632, 642. A horizontal line of powder 660 separates the downward facing convex surface 602 from each of the concave top surfaces 622, 632, and 642. In an aspect, the horizontal line of powder 660 may have a varying width. For example, the concave top surface 622 may correspond to the downward facing convex surface 602 in one dimension (i.e., a vertical plane), but not in another dimension (i.e., a horizontal plane). Alternatively, the concave top surface 612 may be concave in two dimensions.

Figure 9:
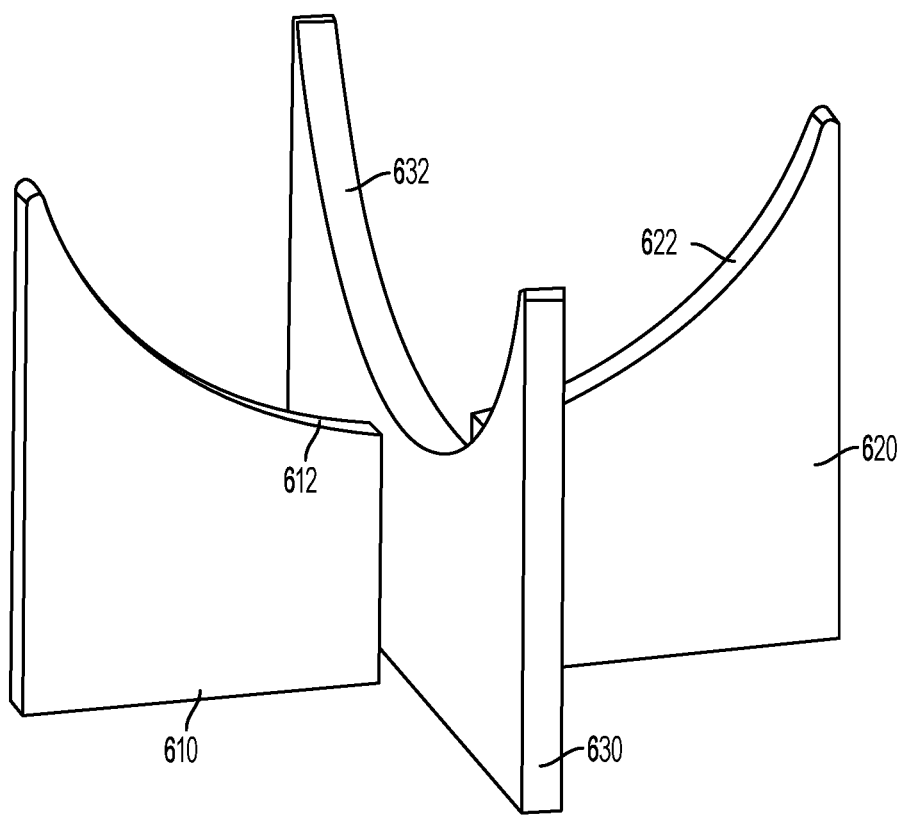
FIG. 9 illustrates a perspective view of the example support structures in FIG. 6.

FIG. 9 illustrates another view of example support structure 610 including supports 610, 620, and 630 without the spherical object 600. The concave top surfaces 622, 632, and 642 are visible.

Figure 10:
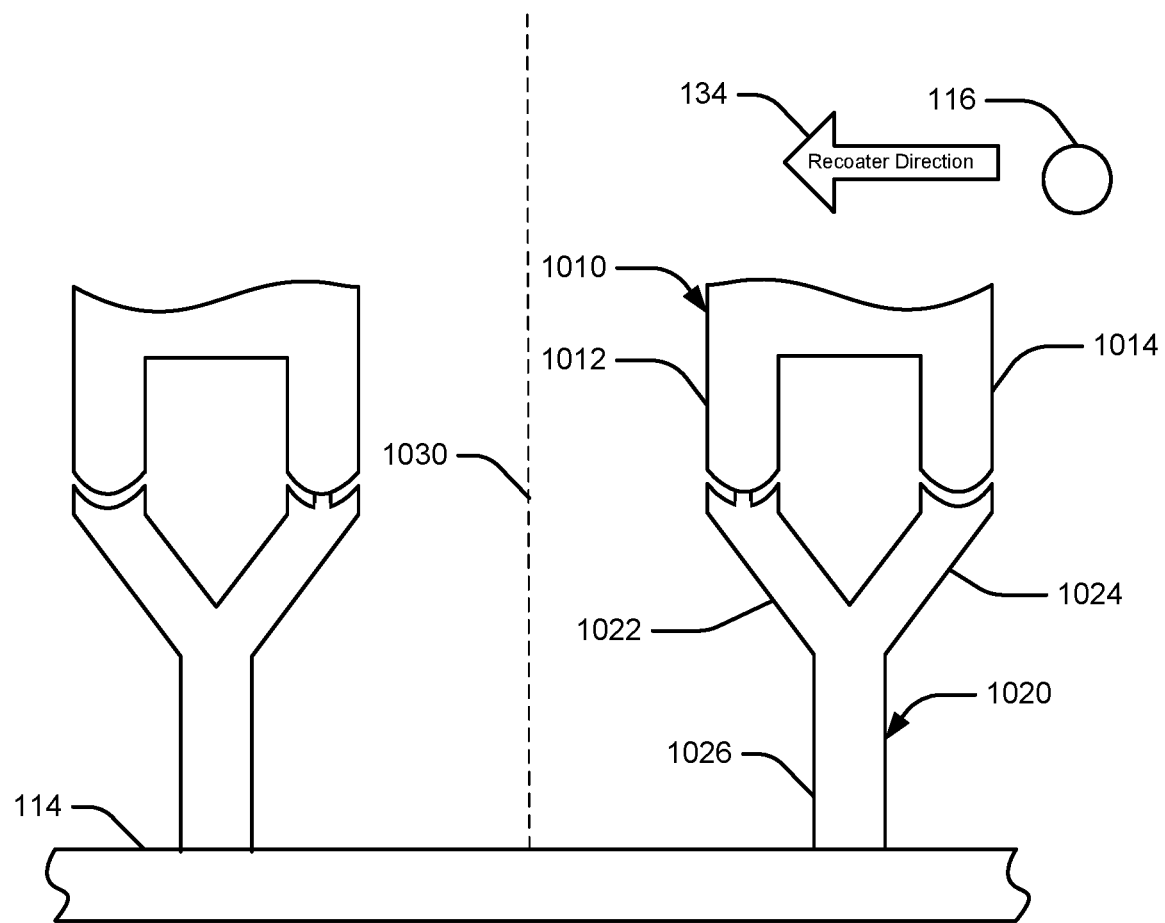
FIG. 10 illustrates an example of a vertical cross-sectional view of a support structure for an object including cylindrical members.

FIG. 10 illustrates an example of a vertical cross-sectional view of a support structure 1020 for an object 1010 including cylindrical members 1012 and 1014. Both the object 1010 and the support structure 1020 may have a center at the axis 1030. The cylindrical member 1012 faces downward and forms a ring. A second cylindrical member 1014 forms a concentric ring connected to the cylindrical member 1012 via the object 1010. The downward facing edge of the cylindrical member 1012 is a downward facing convex surface. The support structure 1020 includes multiple supports 1022 and 1024 connected to a body portion 1026 extending from a platform 114. Each support 1022, 1024 includes an upward facing concave surface. For example, the support 1022 includes an upward facing concave surface supporting the downward facing edge of the cylindrical member 1012. The support 1022 may include a contact surface similar to the contact surface 518 in FIG. 5. The support 1024 includes an upward facing concave surface corresponding to a downward facing convex surface of the cylindrical member 1014. The support 1024 does not contact the cylindrical member 1014. The support 1022 and 1024 are built from the same body portion 1026, but could also be built from the platform 104. The support structure 1020 may provide support for the concentric cylindrical members 1012 and 1014 while allowing the support structure 1020 to be more easily removed than if the supports 1022 and 1024 both include a contact surface.

When it becomes necessary to remove the support structure 210/610/1010 from the object 200/600/1000, the operator may apply force to break the support structure free when contact surfaces are present. The support structure may be removed by mechanical procedures such as twisting, breaking, cutting, grinding, filing, or polishing. Additionally, thermal and chemical post processing procedures may be used to finish the object. When no contact surfaces are present and instead powder has been placed between the object and the support structure during manufacturing, the powder can simply be removed by blowing, for example, using pressurized air. The removal of the support structure 210/610/1010 from the object 200/600/1000 may take place immediately upon or during removal of the object from the powder bed. Alternatively, the support structure may be removed after any one of the post-treatment steps. For example, the object 200/600/1000 and support structure 210/610/1010 may be subjected to a post-anneal treatment and/or chemical treatment and then subsequently removed from the object 200/600/1000 and/or build plate.

Although several examples of support structures and objects have been provided, it should be apparent that other objects may be built in accordance with the present disclosure. For example, any object having a downward facing convex surface may be supported by one or more of the disclosed support structures. In an aspect, the disclosed support structures are used to manufacture parts for aircraft. For example, a fuel nozzle similar to the one disclosed in U.S. Pat. No. 9,188,341 may be manufactured using support structures disclosed herein.

In an aspect, multiple supports described above may be used in combination to support fabrication of an object, prevent movement of the object, and/or control thermal properties of the object. That is, fabricating an object using additive manufacturing may include use of one or more of: scaffolding, tie-down supports, break-away supports, lateral supports, conformal supports, connecting supports, surrounding supports, keyway supports, breakable supports, leading edge supports, or powder removal ports. The following patent applications include disclosure of these supports and methods of their use:

U.S. patent application Ser. No. 15/042,024, titled "METHOD AND CONNECTING SUPPORTS FOR ADDITIVE MANUFACTURING" and filed Feb. 11, 2016;

U.S. patent application Ser. No. 15/041,973, titled "METHODS AND SURROUNDING SUPPORTS FOR ADDITIVE MANUFACTURING" and filed Feb. 11, 2016;

U.S. patent application Ser. No. 15/042,010, titled "METHODS AND KEYWAY SUPPORTS FOR ADDITIVE MANUFACTURING" and filed Feb. 11, 2016;

U.S. patent application Ser. No. 15/042,001, titled "METHODS AND BREAKABLE SUPPORTS FOR ADDITIVE MANUFACTURING" and filed Feb. 11, 2016; and U.S. patent application Ser. No. 15/041,911, titled "METHODS AND LEADING EDGE SUPPORTS FOR ADDITIVE MANUFACTURING" and filed Feb. 11, 2016.

U.S. patent application Ser. No. 15/041,980, titled "METHOD AND SUPPORTS WITH POWDER REMOVAL PORTS FOR ADDITIVE MANUFACTURING" and filed Feb. 11, 2016.

The disclosure of each of these application are incorporated herein in their entirety to the extent they disclose additional support structures that can be used in conjunction with the support structures disclosed herein to make other objects.

Additionally, scaffolding includes supports that are built underneath an object to provide vertical support to the object. Scaffolding may be formed of interconnected supports, for example, in a honeycomb pattern. In an aspect, scaffolding may be solid or include solid portions. The scaffolding contacts the object at various locations providing load bearing support for the object to be constructed above the scaffolding. The contact between the support structure and the object also prevents lateral movement of the object.

Tie-down supports prevent a relatively thin flat object, or at least a first portion (e.g. first layer) of the object from moving during the build process. Relatively thin objects are prone to warping or peeling. For example, heat dissipation may cause a thin object to warp as it cools. As another example, the recoater may cause lateral forces to be applied to the object, which in some cases lifts an edge of the object. In an aspect, the tie-down supports are built beneath the object to tie the object down to an anchor surface. For example, tie-down supports may extend vertically from an anchor surface such as the platform to the object. The tie-down supports are built by melting the powder at a specific location in each layer beneath the object. The tie-down supports connect to both the platform and the object (e.g., at an edge of the object), preventing the object from warping or peeling. The tie-down supports may be removed from the object in a post-processing procedure.

A break-away support structure reduces the contact area between a support structure and the object. For example, a break-away support structure may include separate portions, each separated by a space. The spaces may reduce the total size of the break-away support structure and the amount of powder consumed in fabricating the break-away support structure. Further, one or more of the portions may have a reduced contact surface with the object. For example, a portion of the support structure may have a pointed contact surface that is easier to remove from the object during post-processing. For example, the portion with the pointed contact surface will break away from the object at the pointed contact surface. The pointed contact surface stills provides the functions of providing load bearing support and tying the object down to prevent warping or peeling.

Lateral support structures are used to support a vertical object. The object may have a relatively high height to width aspect ratio (e.g., greater than 1). That is, the height of the object is many times larger than its width. The lateral support structure is located to a side of the object. For example, the object and the lateral support structure are built in the same layers with the scan pattern in each layer including a portion of the object and a portion of the lateral support structure. The lateral support structure is separated from the object (e.g., by a portion of unmelted powder in each layer) or connected by a break-away support structure. Accordingly, the lateral support structure may be easily removed from the object during post-processing. In an aspect, the lateral support structure provides support against forces applied by the recoater when applying additional powder. Generally, the forces applied by the recoater are in the direction of movement of the recoater as it levels an additional layer of powder. Accordingly, the lateral support structure is built in the direction of movement of the recoater from the object. Moreover, the lateral support structure may be wider at the bottom than at the top. The wider bottom provides stability for the lateral support structure to resist any forces generated by the recoater.

Moreover a method of fabricating an object may include consecutively, concurrently, or alternatingly, melting powder to form portions of multiple supports as described above. Additionally, for an object fabricated using multiple supports, the post-processing procedures may include removing each of the supports. In an aspect, a support structure may include multiple supports of different types as described herein. The multiple supports may be connected to each other directly, or via the object. The selection of supports for a specific object may be based on the factors described herein (e.g., shape, aspect ratios, orientation, thermal properties, etc.)

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method for fabricating an object, comprising:
   (a) irradiating a layer of powder in a powder bed to form a fused region;
   (b) providing a subsequent layer of powder over the powder bed by passing a recoater arm over the powder bed from a first side of the powder bed; and
   (c) repeating steps (a) and (b) until the object and at least one support structure is formed in the powder bed,
   wherein the at least one support structure is formed from fused powder and includes a first support and a second support spaced apart from the first support, each of the first support and the second support defining an upward facing concave surface; and
   wherein the object is built on top of the at least one support structure and comprises a first cylindrical member and a second cylindrical member concentric to the first cylindrical member, each of the first cylindrical member and the second cylindrical member defining a downward facing convex surface corresponding to the upward facing concave surface of the first support and the second support, respectively, and wherein at least a portion of the downward facing convex surface is separated from the upward facing concave surface by at least one portion of unfused powder.

2. The method of claim 1, wherein the at least one support structure further comprises a body portion, the body portion extending from a platform upward to support both the first support and the second support.

3. The method of claim 1, wherein the at least one support structure further comprises a contact surface that physically contacts the downward facing convex surface of the object.

4. The method of claim 3, wherein the contact surface extends only from the first support to the first cylindrical member.

* * * * *